United States Patent
Teran Guajardo et al.

(10) Patent No.: US 11,792,184 B2
(45) Date of Patent: Oct. 17, 2023

(54) AUTOPILOT RE-ENROLLMENT OF MANAGED DEVICES

(71) Applicant: Microsoft Technology Licensing, LLC, Redmond, WA (US)

(72) Inventors: Adrian Francisco Teran Guajardo, Redmond, WA (US); Brian Stuart Perlman, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 378 days.

(21) Appl. No.: 16/704,901

(22) Filed: Dec. 5, 2019

(65) Prior Publication Data

US 2021/0176232 A1    Jun. 10, 2021

(51) Int. Cl.
*H04L 9/40* (2022.01)

(52) U.S. Cl.
CPC ...... *H04L 63/0838* (2013.01); *H04L 63/1416* (2013.01)

(58) Field of Classification Search
CPC ....... G06F 21/44; G06F 21/46; H04L 63/083; H04L 63/0838; H04L 9/3226; H04L 9/3228; H04L 63/1416
See application file for complete search history.

(56) References Cited

U.S. PATENT DOCUMENTS

| 7,444,394 B2* | 10/2008 | Igarashi | H04L 29/12009 709/223 |
| 8,341,698 B2 | 12/2012 | Tan | |
| 9,178,877 B1 | 11/2015 | Koneru | |
| 9,237,016 B2 | 1/2016 | De Atley et al. | |
| 9,749,131 B2 | 8/2017 | Baghdasaryan | |
| 10,142,327 B2 | 11/2018 | Mohamad Abdul et al. | |
| 2005/0149949 A1* | 7/2005 | Tipton | H04L 43/0817 719/321 |
| 2011/0099625 A1* | 4/2011 | Thom | G06F 21/34 726/18 |
| 2011/0179493 A1* | 7/2011 | Ishida | G06F 11/2038 726/25 |
| 2013/0064132 A1* | 3/2013 | Low | H04W 24/02 370/254 |

(Continued)

FOREIGN PATENT DOCUMENTS

| DE | 102017121648 B3 * | 1/2019 | ........... H04L 9/3228 |
| FR | 2956272 A1 * | 8/2011 | ......... H04L 63/0838 |

OTHER PUBLICATIONS

"International Search Report and Written Opinion Issued in PCT Application No. PCT/US20/059260", dated Feb. 5, 2021, 11 Pages.

(Continued)

*Primary Examiner* — Daniel B Potratz
*Assistant Examiner* — Matthias Habtegeorgis
(74) *Attorney, Agent, or Firm* — Rainier Patents, P.S.

(57) ABSTRACT

This document relates to a process for autopilot re-enrollment of managed devices in a network following a reset of the managed devices. Upon determining that the managed devices lack a hardware authenticator, a one-time password can be issued to the managed devices that may be stored in a persistent memory, and upon reset of the managed devices, the one-time password can be returned for validation and the managed devices can be automatically re-enrolled in the network upon validation of the one-time password.

21 Claims, 3 Drawing Sheets

(56) References Cited

U.S. PATENT DOCUMENTS

| | | | | |
|---|---|---|---|---|
| 2013/0139089 | A1* | 5/2013 | Cho | H04N 21/44227 715/771 |
| 2015/0071438 | A1* | 3/2015 | Lambert | H04W 12/50 709/227 |
| 2016/0165439 | A1* | 6/2016 | Chen | H04L 63/0281 726/12 |
| 2016/0188307 | A1* | 6/2016 | Reagan | H04L 63/0876 717/177 |
| 2016/0352702 | A1* | 12/2016 | Gallant | H04L 63/123 |
| 2017/0126660 | A1* | 5/2017 | Brannon | H04L 63/12 |
| 2018/0159958 | A1 | 6/2018 | Olive et al. | |
| 2019/0026442 | A1 | 1/2019 | Perlman et al. | |
| 2019/0036914 | A1* | 1/2019 | Tzur-David | H04L 63/10 |
| 2020/0389478 | A1* | 12/2020 | Abbaszadeh | H04L 41/16 |
| 2021/0111895 | A1* | 4/2021 | Doyon | G06F 21/44 |
| 2021/0135936 | A1* | 5/2021 | Casey | H04L 41/0856 |

OTHER PUBLICATIONS

"Re-Enrolling A Client into the IDM Domain", Retrieved from: https://web.archive.org/web/20190716210036/https:/access.redhat.com/documentation/en-us/red_hat_enterprise_linux/7/html/linux_domain_identity_authentication_and_policy_guide/client-re-enrolling, Retrieved Date: Jul. 16, 2019, 3 Pages.

"SecureAuth App Enrollment Configuration Guide", Retrieved from: https://docs.secureauth.com/display/82docs/SecureAuth+App+Enrollment+Configuration+Guide, Retrieved Date: Sep. 13, 2019, 13 Pages.

Mantri, Siddharth, "Windows Autopilot: What's new and what's next", Retrieved from: https://techcommunity.microsoft.com/t5/Windows-IT-Pro-Blog/Windows-Autopilot-What-s-new-and-what-s-next/ba-p/201884#Enrollment, Jun. 7, 2018, 22 Pages.

Mayer, Kurt, "Windows Autopilot Scenarios: Native Approach (Part 1)", Retrieved from: https://www.swc.com/blog/cloud/windows-autopilot-scenarios-modernizing-windows-deployment-part-1, Jun. 20, 2018, 19 Pages.

* cited by examiner

AUTOPILOT RE-ENROLLMENT OF MANAGED DEVICES

BACKGROUND

Within organizations throughout the world, a common need for Information Technology (IT) administrators is the ability to reset (i.e., erase) a device and place the device back into an initial factory settings state. However, upon resetting to the initial factory settings state, while certain software can be provided through a provisioning process, certain configuration settings or security certificates for the device can be lost, which can then require the IT administrator to manually configure the device in order to restore access of the device to a network, resulting in added expense and time in restoring the device to a useable state. As such, there remain difficulties in rapidly erasing and provisioning devices in a convenient manner.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Overview

Figure 1:
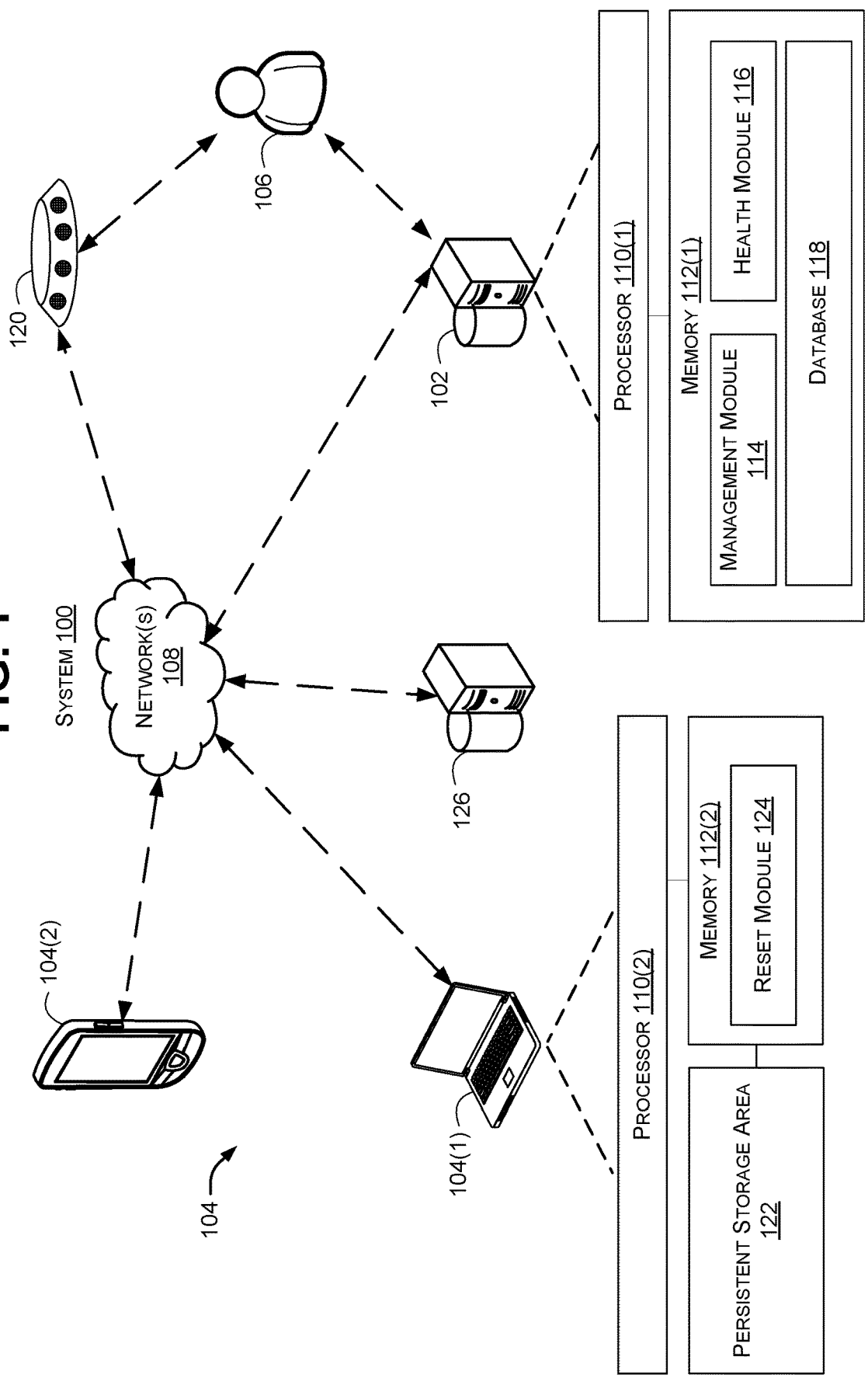
FIG. 1 illustrates an example system that is consistent with some implementations of the present concepts.

In various organizations, IT administrators are typically tasked with maintaining stability and security of the devices that are connected to the networks of the organization. However, over time, such devices within the organization can be increasingly exposed to security threats that may compromise data stored on the devices and the overall network, and may adversely affect functionality of the network. For instance, a device can be infected with malware that enables unauthorized access to data stored on the device, and/or that can enable functionality of the device to be hijacked by an unauthorized party. Alternatively, the device may be utilized to improperly access sensitive data stored on the network.

Upon determining that a device is compromised and can present a security risk to the organization, the device can be formatted and reset to an initial factory settings state in order to clear the compromising software that has infected the device. At this point, an IT administrator can be tasked with manually configuring the device to reestablish network connectivity in order to perform provisioning of the organization's basic settings and software on the device. In certain organizations, this configuration of the device can include reestablishing security protocols and certificates on the device, which can often be a laborious and time intensive task, as the device may be required to authenticate itself with a provisioning server, and also attest that it is clear of any malicious software or compromising data.

In certain instances, configuration techniques of the device can include the exchanging of keys between the device and a provisioning server for purposes of authenticating the device. That is, when the device is reset to an initial factory settings state, the device can automatically contact a provisioning server to request reauthorization of the device. In this instance, the device may be viewed as an unknown device to the provisioning server. As a result, the provisioning server may need to authenticate the device by way of, for example, issuing challenges by use of public or private keys to the device in order to authenticate the device for re-enrollment in the network. However, this technique of configuration presumes that the provisioning server does not know the identity of the device, and has no prior knowledge that the device may have been previously authorized to have access to the network. Moreover, such challenges are time consuming and often can require manual intervention by an IT administrator.

Certain methods can be utilized to improve upon such a key-based challenge by utilizing components that can self-authenticate the device upon resetting of the device. For example, certain devices can utilize a hardware authenticator, such as a Trusted Platform Module (TPM), to assist with various security aspects of the device, such as for authenticating a device for access to a network. A TPM can be a hardware chip, such as a microcontroller, that can be included as part of a device's motherboard. Generally, a TPM can represent a secure processing environment that can be leveraged to store security assets, such as security keys, certificates, and passwords, that can be used to authenticate a device. Further, a TPM can be utilized to store measurements of valid device states (e.g., operating system states), which can be used to ascertain whether a current device state has been compromised such that the device may be unsecure and/or untrusted.

Thus, in instances where a device may have a TPM, the device can perform a re-enrollment process for a formatted device automatically using the information associated with the TPM. That is, when a device reset command is issued to the device, the device may be restored to an initial factory settings state, and upon rebooting, may access the TPM to issue identifying information to a provisioning server for authentication and re-enrollment in the network. In such instances, while the reset device would still constitute an unknown device to the provisioning server, the reset device can identify itself and perform authentication without the need for involvement by an IT administrator.

In many instances, however, the existence of a TPM on a device can be rare, and there may be existing devices spread throughout an organization where resetting of devices may need to occur several times a day on multiple devices. As manual intervention can significantly increase the time and cost associated with resetting numerous devices, it is desirable to have a re-enrollment process for devices that lack a TPM that can be performed in an automated fashion without any user intervention.

As such, concepts disclosed herein can provide technical solutions for automatically re-enrolling devices that may lack hardware authenticators, such as a TPM, back into a network without requiring user intervention. Due to the nature of the device being a known authorized entity in the current network prior to reset, the device can be effectively preauthorized by provisioning the device with a single-use authorization, such as a one-time password (OTP), that can be stored in a persistent area of the device before the reset operation occurs, and which can be used to automatically authenticate the device and enable the device to rejoin the network upon reset.

It is to be appreciated that any reference herein to a one-time password, or OTP, is not restricted to purely passwords, and the term may include any single-use authorization method, which may include one-time pre-shared keys, single use secrets, passwords, tokens, unique identifiers, checksum values, a cryptographic nonce, or any other type of credential that can be provided for single-use authorization. Such an OTP may have restrictions associated with the OTP, such as being a time-bound credential that should be provided to an authenticating server within the time limits, or a credential that may be tied to a hardware identifier associated with the device. Thus, upon resetting of the device, the OTP can be utilized to assist with authentication and re-enrollment of the device into the network in a user-less fashion, saving the organization time and cost associated with IT administration.

Example System

With reference to FIG. 1, an example system 100 for performing autopilot re-enrollment in accordance with techniques disclosed herein is provided. As depicted in FIG. 1, system 100 can comprise a management server 102 that can be utilized to manage the formatting and provisioning of one or more managed device(s) 104, which may include desktop or laptop devices 104(1) or portable devices 104(2), for example. The management of managed devices 104 may be initiated by an administrator 106, who may monitor that status of managed devices 104 and can issue reset requests to individual devices when appropriate.

There may be multiple reasons for why a managed device may be reset, such as the device becoming compromised by malicious software, or a software update that may have rendered the device unstable during normal operation. Alternatively, as is often the case in large organizations, managed devices may frequently be reassigned between different groups within the organization or between individual employees, such as when an employee leaves the organization and the managed device remains behind in an office. In this instance, the managed device can be reset to an initial factory settings state and provisioned with software appropriate for the organization or individual.

Management server 102 may be in communication with managed devices 104 by way of a network 108 (e.g., the Internet or an intranet). Management server 102 and managed devices 104 may each comprise a processor 110 and memory 112, wherein the memory 112 may have various software modules that can be executable by the processor 110 for performing the processes disclosed herein. Memory 112 can include both persistent storage resources, such as magnetic or solid-state drives, and volatile storage, such as one or more random-access memory devices. In some cases, the modules described herein in connection with memory 112 can be provided as executable instructions that are stored on persistent storage devices, loaded into the random-access memory (RAM), and read from RAM by the processor for execution.

Memory 112 can include or have access to a management module 114, which may be a software program executable by processor 110 for displaying a listing of managed devices to administrator 106 and allowing the administrator to issue commands regarding the managed devices. For example, management module 114 may include a graphical user interface (GUI) that can display a visual depiction of managed devices within the organization, and present information to administrator 106 about the relative health or status of the managed device. Management module 114 may interact with a health module 116 that can actively monitor network and remote device health across the network in real-time. Alternatively, health module 116 may utilize a database 118 to determine whether IT service tickets have been issued regarding any managed devices.

For example, a managed device on the network may have been detected by health module 116 as making malicious attempts to access certain secured portions of the organizations network. Management module 114 may therefore display a visual indicator that can depict to administrator 106 that the managed device may be compromised, and can further recommend that the managed device be reset to an initial factory settings state. Alternatively, a user of a managed device may have submitted an IT service ticket through an online portal, indicating that the managed device is exhibiting problematic behavior. Management module 114 can therefore display a visual indication to administrator 106 that a service ticket has been issued for the particular managed device, and administrator 106 can instruct management server 102 to issue a reset command to the managed device in order to fix the problematic behavior.

Administrator 106 may select a particular managed device by way of the GUI, such as by way of a cursor or by interacting with a touch-sensitive display associated with management server 102, in order to review detailed information regarding the managed device, such as information collected by health module 116. Administrator 106 can then issue commands regarding the managed device, such as a reset command to have management module 114 handle resetting of the managed device. In certain implementations, management module 114 can allow administrator 106 to select a plurality or all of the managed devices, which may allow management server 102 to perform batch operations on multiple managed devices. Such reset commands may be issued by administrator 106 depending on a number of different factors.

Alternatively, in some implementations, management module 114 may be configured to automatically determine that certain managed devices should be issued a reset command immediately, without waiting for approval or interaction by administrator 106. For example, administrator 106 may configure management module 114 to automatically issue a reset command to a managed device if certain criteria regarding the observed health of the managed device becomes known, such as if the managed device contains a malicious threat. In certain implementations, health module 116 may consult a listing that may be stored in database 118, detailing known dangerous malicious viruses or software. Then, if health module 116 determines that a managed device includes any such virus or software, an immediate reset command can be sent to the managed device to prevent further spread throughout the network.

In certain implementations, administrator 106 may interact directly with management server 102, and may issue reset requests directly to management server 102 such as described above via management module 114. Alternatively, administrator 106 may utilize a remote device 120 that may have network monitoring capabilities. For example, remote device 120 may interact with management server 102, and more specifically, can interact with management module 114 and health module 116 to provide detailed information to administrator 106 at a remote setting. Administrator 106 can therefore issue commands to management module 114 remotely by way of remote device 120.

Remote device 120 may be a standard computing device, such as a desktop or laptop computer, or may be a portable computing device, such as a mobile phone. Alternatively, remote device 120 may be an interactive device that can be voice controlled by administrator 106. For example, remote device 120 may be an interactive device that enables human interaction with management server 102 via, for example, voice commands. Such remote devices may include, for example, various "smart" home electronics devices or "Internet of things" (IoT) devices that may be communicatively coupled to network(s) 108 for interaction with management server 102.

Upon issuance of a reset command to managed device 104, management server 102 may coordinate the issuance of an OTP to the remote device for use by the device in autopilot re-enrollment, i.e., an automated authorization and re-enrollment into the network. The OTP can be stored in a persistent storage area 122 associated with managed device 104, where the OTP can persist even after resetting of the device to an initial factory settings state. Persistent storage area 122 may also store an image of the initial factory settings state, for loading into memory upon erasing of the memory of the device.

Resetting of managed device 104 can be performed in accordance with a reset module 124, which may be a firmware-based program that can erase data associated with managed device 104, and load new data to the device according to the image stored in persistent storage area 122. Then, once the device is restored to the initial factory settings state, the OTP can be extracted and used by the device in an automatic authentication and re-enrollment process. Upon issuance of the OTP to managed device 104, management server 102 may store a copy of the OTP on an OTP storage server 126, which can be used as a repository of current and previously used OTPs. Specifics of the autopilot re-enrollment process is described below with reference to FIG. 2.

Example Process for Autopilot Re-Enrollment

Figure 2:
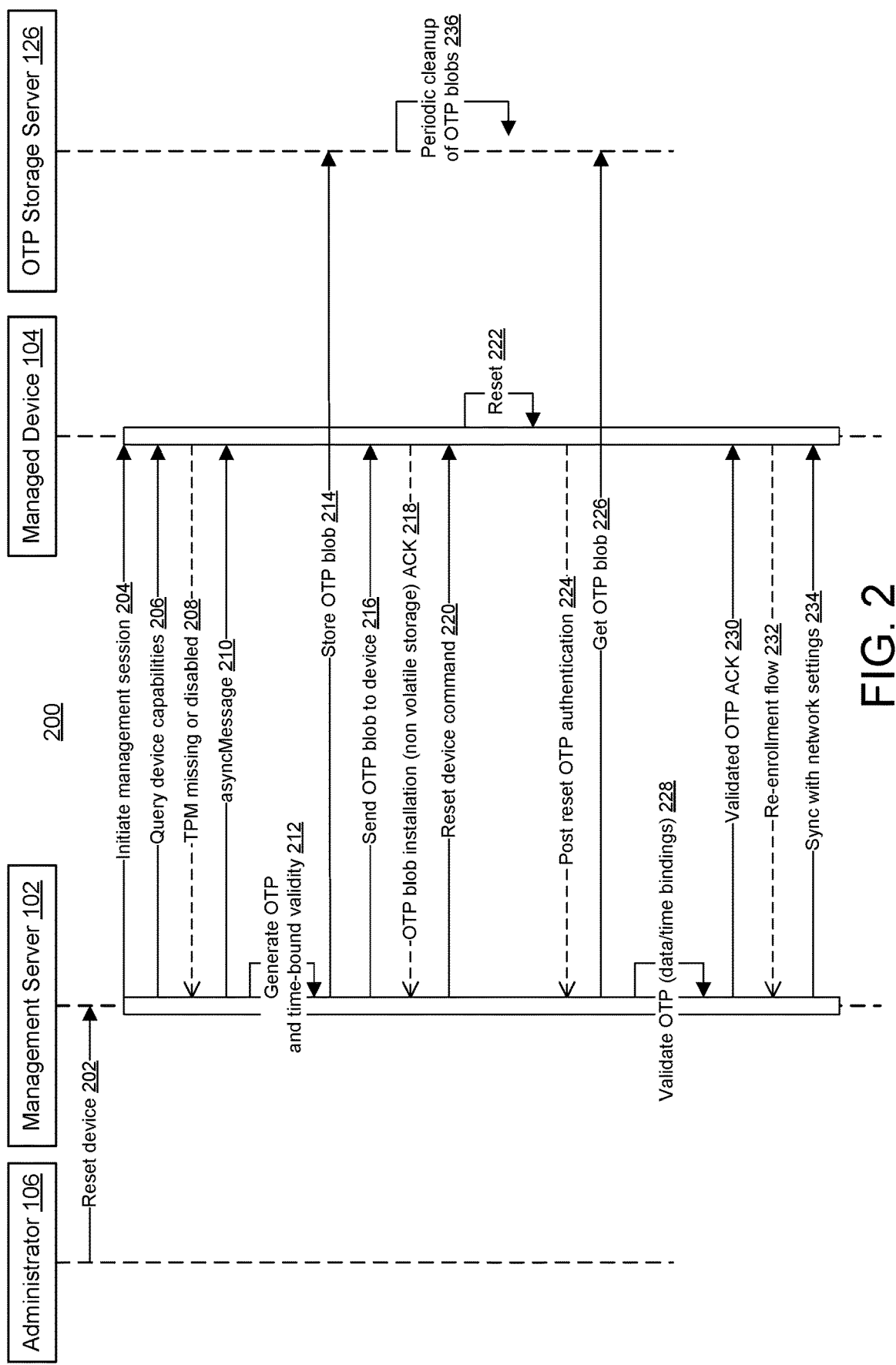
FIG. 2 illustrates an example process flow that is consistent with some implementations of the present concepts.

FIG. 2 depicts an example process 200 for autopilot re-enrollment which may be performed by system 100, in accordance with one implementation. As depicted in FIG. 2, administrator 106 may issue a reset device command at step 202 to management server 102. As discussed earlier, administrator 106 may utilize a graphical user interface on management server 102 to select one or more managed devices from a listing of known managed devices, and upon selection of one or more of the managed devices, instruct a resetting operation for the managed devices, thereby initiating a reset device command. Alternatively, administrator may utilize remote device 120 to interact with management server 102 in order to initiate reset device command.

Upon receipt of a reset device command, management server 102 may initiate a management session of managed device 104 at step 204. This may place a lock on the managed device 104 to prevent a user from inadvertently using the managed device while it is being reset. Next, at step 206, management server 102 may query the device capabilities of managed device 104, such as to determine the existence of a hardware authenticator. As noted earlier, certain managed devices may include a TPM, and if a TPM is included with the managed device, the TPM can be used to perform automatic re-enrollment for the device. However, in the instance that the TPM is either missing or disabled, managed device 104 can indicate this condition to management server 102 at step 208. Having received a message specifying the capabilities of the managed device, management server 102 can send a synchronizing message to managed device 104 at step 210 to ensure that both systems are synced.

Next, at step 212, management server 102 may generate the OTP to be used for autopilot re-enrollment of managed device 104. The OTP can be a password that may expire after a single use, and may have one or more validity criterium that are to be met for management server 102 to accept the OTP when it is supplied by managed device 104. For example, the OTP may be associated with a time-bound validity, where the OTP may be valid only if it is provided to management server 102 within the time limits imposed by the time-bound validity. Alternatively, the OTP can have a credential that may be tied to a hardware identifier associated with the device, such that an OTP that does not match with particular expected hardware of a managed device may not be accepted. As another example, the OTP can be location-bound, such that the OTP must be received by a device within a certain IP address range or geographical area defined by a network.

The OTP may be generated as a collection of data that may include the validity criteria, and may be stored in an OTP "blob," a term referring to a collection of data. Additionally, the OTP blob may contain data, such as an automated script that can execute after the resetting operation, that can enable managed device 104 to reestablish contact with management server 102 after the resetting operation is complete, in order to provide the OTP blob back to the management server. Alternatively, instead of contacting management server 102, managed device 104 may access particular configuration data that may also be stored within the OTP blob, such as a particular wireless name and/or password, or alternatively a security certificate for local network connections.

In some implementations, the blob may store the data as a number of name/value pairs, and the automated script can look for an explicit policy stored within the name/values pairs. For example, the script may attempt to locate an explicit policy name in the name/values pairs having a name specifying that the value is the OTP, such as by searching for a "OnetimePasswordData" name, and extracting the associated value. The OTP blob can also contain additional data, such as one or more of an issue date, an expiration time, an expiration time hint (such as to specify when the validity of the OTP may expire), a nonce that can be used for validation, and/or a signed hash value, such as one generated via SHA-256) to confirm that the OTP blob has not been modified after management server 102 generated the blob.

At step 214, management server 102 may store the generated OTP blob on OTP storage server 126, which may include a database for storing a plurality of OTP blobs and handling requests received from management server 102 to store and retrieve blobs. At step 216, management server 102 may also send the generated OTP blob to managed device 104 for installation into persistent storage area 122, which may be a non-volatile storage area. Upon installation of the blob, an acknowledgment at step 218 can be provided back to management server 102, confirming that the OTP blob was installed into the persistent memory of managed device 104.

Upon receiving the acknowledgment that the OTP blob was successfully installed, management server 102 can issue a reset device command at step 220 to have managed device 104 do a reset. At step 222, reset module 124 may automatically initiate a resetting operation of managed device 104 to restore the device to an initial factory settings state, such as by using an image stored in persistent storage area 122. The managed device 104 may have the data stored in its memory erased, thereby getting rid of any potential malicious software or software issues that may be causing the device to malfunction.

Once the resetting operation is completed, at step 224, managed device 104 may automatically reestablish communication with management server 102, such as by executing an automated script that may be contained in the OTP blob, and can provide a post-reset password in the form of the OTP that was stored in persistent storage area 122 to management server 102 for authentication. At step 226, having received the OTP issued by managed device 104, management server 102 may contact OTP storage server 126 to retrieve the OTP blob that was previously stored on the server at step 214. The OTP blobs stored on OTP storage server 126 may be indexed according to identifiers associated with the managed devices, such that management server 102 can provide the managed device identifier to OTP storage server 126 for easy retrieval of the correct OTP blob.

Upon receiving the OTP blob from OTP storage server 126, management server 102 can validate the OTP that was received from managed device 104 at step 228. Specifically, management server 102 can compare the OTP received from the managed device to the OTP that was retrieved from OTP storage server 126, and confirm that the password match. Furthermore, management server 102 can additionally confirm that any validity criteria associated with the OTP are met.

For example, management server 102 may confirm that the OTP received from managed device 104 was received within the time period specified by a time-bound validity criteria associated with the received OTP. Alternatively, management server 102 may confirm that the OTP is received from a device within an expected IP address range, an expected geographical location, and/or other such parameters. If management server 102 determines that the OTP received from managed device 104 is invalid, management server 102 can reject the OTP authentication request, and indicate to an administrator that the particular managed device may require manual intervention.

Upon validation of the OTP, at step 230, management server 102 may send an acknowledgment of validation of the OTP to managed device 104, which may then send a re-enrollment request at step 232 back to management server 102. The re-enrollment request can request that managed device 104 be provided with the previously granted security settings and/or certificates that were associated with the managed device prior to the resetting operation. At step 234, management server 102 can re-enroll the newly reset managed device into the organization's network and provide the various security settings and/or certifications that were associated with the managed device to allow it to communicate on the network.

Finally, at step 236, OTP storage server may periodically perform a cleanup of OTP blobs that are stored within the database. For example, OTP storage server may determine that all OTP blobs that have been expired for 30 days can be expunged, and notification of such expunged OTP blobs can be reported back to management server 102, so that management server 102 can invalidate the issued OTPs.

It is to be appreciated that alternative or additional steps may be provided beyond those specified in FIG. 2. For example, if a managed device is determined to have malicious software installed on the device prior to device reset, an additional holding step may be provided in the autopilot re-enrollment process. In this situation, the device may go through the reset process and provide the OTP back to management server 102, and upon validating the OTP received from managed device 104 at step 228, management server 102 may issue a notification to administrator 106 providing a detailed report on why the managed device was reset, and allowing selection of a confirmation from the administrator as to whether management server 102 should continue with the re-enrollment process. This can provide administrator 106 with additional time to do a personal check of the computer system or the user associated with the computer system, in order to avoid any repeated risk violations in the future.

Thus, as the steps of process 200 can be fully automated with the exception of issuing the initial reset command from the administrator, the organization can save an incredible amount of time and workforce cost in performing organization-wide resetting of managed devices.

Example Autopilot Re-Enrollment Method

Figure 3:
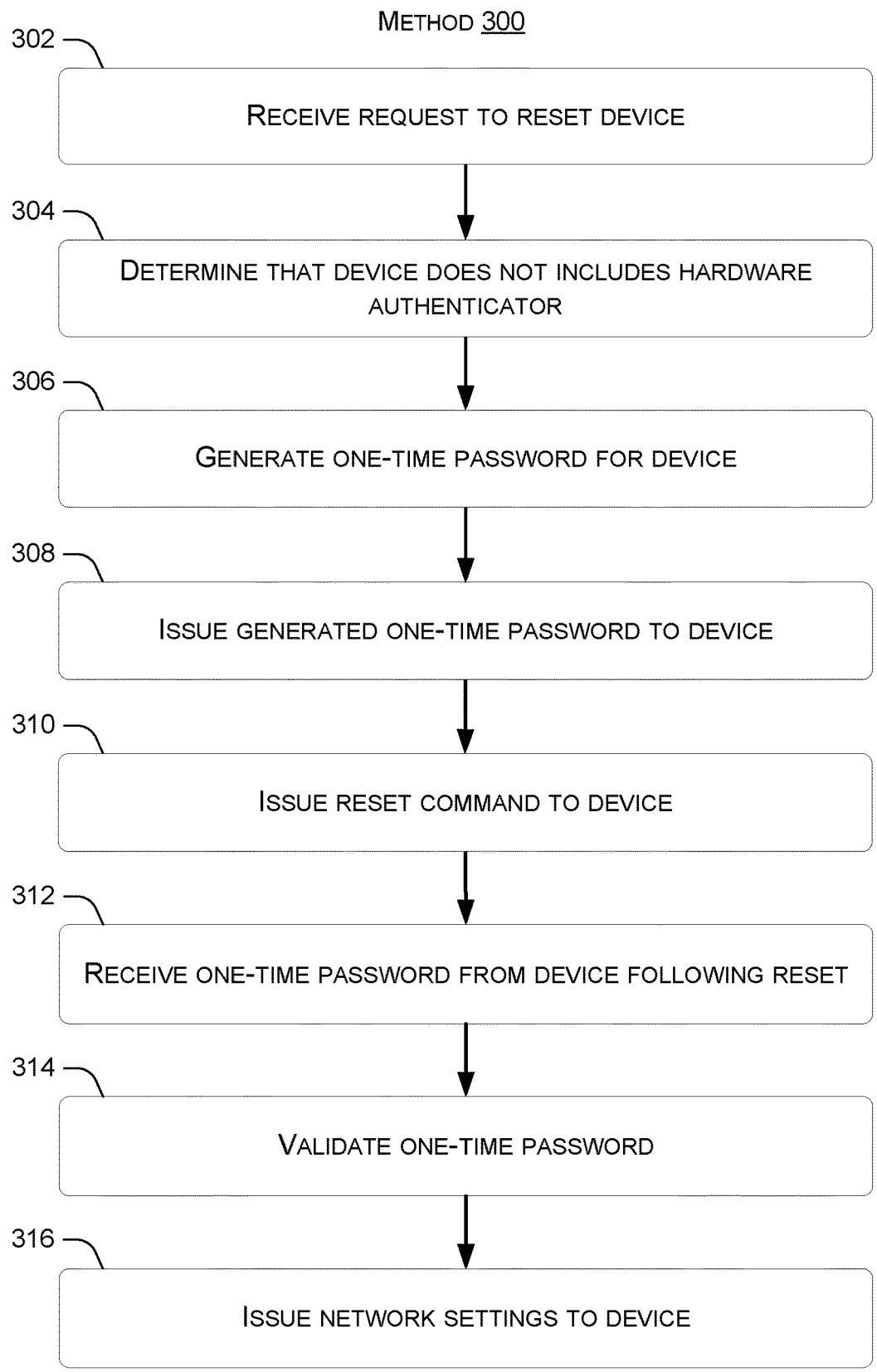
FIG. 3 illustrates an example method or technique that is consistent with some implementations of the present concepts.

The following discussion presents an overview of functionality that can provide autopilot re-enrollment functionality as described above. FIG. 3 illustrates an example method 300, consistent with the present concepts. Method 300 can be implemented by a single device, e.g., management server 102, or can be distributed over one or more servers, client devices, etc. Moreover, method 300 can be performed by one or more modules, such as management module 114 and/or health module 116.

At block 302, a request may be received to reset a managed device. For example, an administrator 106 may issue a request for managed device 104 to have a reset operation performed by management module 114. Administrator 106 may issue a direct request to have managed device 104 reset, or in some implementations, health module 116 may automatically initiate the request based on a monitored state of managed device 104. For example, if health module 116 determines that managed device 104 contains a malicious threat, a reset request may be issued without need for administrator involvement.

At block 304, management module 114 can determine whether managed device 104 lacks a hardware authenticator, such as a TPM, which would enable the device to automatically validate itself to the network. As it can be determined that managed device 104 does not include a hardware authenticator, at block 306, management module 114 can generate a one-time password to be used by the managed device for validation and re-enrollment of the managed device in the network after a reset.

At block 308, the one-time password can be issued to managed device 104, and this one-time password can be stored in persistent storage area 122 of the managed device. Then, at block 310, management module 114 can issue a reset command to managed device 104, which can cause the managed device to perform reset activities and revert to an initial factory settings state.

At block 312, management module 114 can receive a one-time password back from managed device 104 following the reset operation of the managed device. Then, at block 314, management module 114 can validate the one-time password, such as by comparing the received one-time password to the one-time password that was previously issued to the managed device. Furthermore, management module 114 may validate whether certain validation criteria associated with the one-time password are met, such as whether the one-time password was received within a time limit imposed by a time-bound or location-bound validity criteria.

Finally, at block 316, upon validation of the one-time password received by managed device 104, management module 114 may issue network settings to the managed device for re-enrollment of the managed device onto the network. In some implementations, such issued network settings may also include certain provisioning settings and/or software that should be associated with the managed device.

Device Implementations

As noted above with respect to FIG. 1, system 100 may include several devices, including a management server 102, managed devices 104, remote device 120, and OTP storage server 126. As also noted, not all device implementations can be illustrated, and other device implementations should be apparent to the skilled artisan from the description above and below.

The term "device", "computer," "computing device," "client device," "server," and or "server device" as possibly used herein can mean any type of device that has some amount of hardware processing capability and/or hardware storage/memory capability. Processing capability can be provided by one or more hardware processors (e.g., hardware processing units/cores) that can execute computer-readable instructions to provide functionality. Computer-readable instructions and/or data can be stored on persistent storage or volatile memory. The term "system" as used herein can refer to a single device, multiple devices, etc.

Memory 112 can be storage resources that are internal or external to any respective devices with which it is associated. Memory 112 can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others, which may constitute memory 112.

In some cases, the devices are configured with a general-purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that devices generally can have input and/or output functionality. For example, computing devices can have various input mechanisms such as keyboards, mice, touchpads, voice recognition, gesture recognition (e.g., using depth cameras such as stereoscopic or time-of-flight camera systems, infrared camera systems, RGB camera systems or using accelerometers/gyroscopes, facial recognition, etc.). Devices can also have various output mechanisms such as printers, monitors, etc.

Also note that the devices described herein can function in a stand-alone or cooperative manner to implement the described techniques. For example, the methods described herein can be performed on a single computing device and/or distributed across multiple computing devices, such as IoT devices, that communicate over one or more network(s). Without limitation, such one or more network(s) can include one or more local area networks (LANs), wide area networks (WANs), the Internet, and the like.

Various device examples are described above. Additional examples are described below. One example includes a system comprising a processor and a computer-readable storage media storing instructions that, when executed by the processor, cause the system to automatically manage a reset operation for a managed device by: generating a one-time password for use by the managed device in re-enrollment of the managed device in a network following the reset operation, issuing the one-time password to the managed device, receiving an authentication request from the managed device following the reset operation, the authentication request including a post-reset password, and validating the post-reset password against the issued one-time password to confirm re-enrollment of the managed device in the network.

Another example can include any of the above and/or below examples where automatically managing the reset operation of the managed device further comprises displaying a listing of managed devices on a graphical user interface, receiving a selection of the managed device from the listing of managed devices to indicate that a reset operation should be performed on the selected managed device, and issuing a reset operation to the selected managed device.

Another example can include any of the above and/or below examples where validating the post-reset password comprises checking the post-reset password against a one-time password stored on a storage server.

Another example can include any of the above and/or below examples where validating the post-reset password further comprises checking the post-reset password against a validity criteria.

Another example can include any of the above and/or below examples where the validity criteria is a time-bound validity criteria, and the post-reset password must be received from the managed device within a time limit specified by the time-bound validity criteria.

Another example can include any of the above and/or below examples where the validity criteria is a location-bound validity criteria.

Another example can include any of the above and/or below examples where automatically managing the reset operation of the managed device further comprises determining whether the managed device includes a hardware authenticator for re-enrollment of the managed device on the network after reset of the managed device.

Another example can include any of the above and/or below examples where the reset operation is submitted by an administrator of the network.

Another example can include any of the above and/or below examples where the reset operation is automatically initiated by the system upon determining that the managed device contains a malicious threat.

Another example can include any of the above and/or below examples where issuing the one-time password to the managed device further comprises instructing the managed device to install the one-time password in a persistent storage area such that the one-time password persists through the reset operation.

Another example can include any of the above and/or below examples where automatically managing the reset operation of the managed device further comprises issuing to the managed device, after the post-reset password is validated, network settings that were associated with the managed device prior to the reset operation.

Another example includes a method comprising receiving a request to reset a device on a network, determining that the device does not include a hardware authenticator for re-enrollment of the device on the network after reset of the device, generating a one-time password for use by the device in automatic re-enrollment in the network after reset of the device upon determining that the device does not include the hardware authenticator, and issuing the generated one-time password to the device.

Another example can include any of the above and/or below examples where the method further comprises receiving the one-time password from the device after the device was reset, validating the one-time password, and automatically providing network settings to the device that were present on the device prior to reset of the device.

Another example can include any of the above and/or below examples where validating the one-time password comprises checking the one-time password against a one-time password stored on a storage server.

Another example can include any of the above and/or below examples where validating the one-time password further comprises checking the one-time password against a validity criteria.

Another example can include any of the above and/or below examples where the validity criteria is a time-bound validity criteria, and the one-time password must be received from the device within a time limit specified by the time-bound validity criteria.

Another example includes a system comprising a processor and a memory storing computer-readable instructions, which when executed by the processor, cause the processor to re-enroll the system in a network automatically by: receiving, from a management server, a one-time password for use in re-enrollment of the system into a network, installing the one-time password into a persistent storage area, initiating a reset process to reset the system to an initial factory settings state, and issuing the one-time password that was installed in the persistent storage area to the management server for validation to re-enroll the system in the network.

Another example can include any of the above and/or below examples where the system further comprises receiving, from the management server, network settings that were associated with the system prior to initiating the reset process.

Another example can include any of the above and/or below examples where the one-time password stored in the persistent storage area persists through the reset process.

Another example can include any of the above and/or below examples where the system further comprises indicating, to the management server, that a hardware authenticator is not present in the system.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A management server comprising:
   a processor; and
   a computer-readable storage media storing instructions that, when executed by the processor, cause the management server to:
   responsive to receiving a request for a reset operation of a managed device, generate a one-time password usable by the managed device in re-enrollment of the managed device in an organizational network following the reset operation, the organizational network being associated with a particular organization;
   send the one-time password over a public network to the managed device;
   receive an authentication request over the public network from the managed device following the reset operation, the authentication request including a post-reset password;
   responsive to validation of the post-reset password against the one-time password, confirm re-enrollment of the managed device in the organizational network; and
   after the post-reset password is validated, send configuration settings over the public network from the management server to the managed device, wherein the configuration settings were associated with the managed device prior to the reset operation and allow the managed device to access the organizational network.

2. The management server of claim 1, wherein the instructions, when executed by the processor, cause the management server to:
   display a listing of managed devices on a graphical user interface;
   receive a selection of the managed device from the listing of managed devices to indicate that the reset operation should be performed on the managed device; and
   issue the reset operation to the managed device.

3. The management server of claim 1, wherein the instructions, when executed by the processor, cause the management server to:

validate the post-reset password by checking the post-reset password against a one-time password stored on a storage server.

4. The management server of claim 3, wherein validating the post-reset password further comprises checking the post-reset password against a validity criteria.

5. The management server of claim 4, wherein the validity criteria is a time-bound validity criteria, and the post-reset password must be received from the managed device within a time limit specified by the time-bound validity criteria.

6. The management server of claim 4, wherein the validity criteria is a location-bound validity criteria.

7. The management server of claim 1, wherein the instructions, when executed by the processor, cause the management server to:
  determine whether the managed device includes a hardware authenticator for re-enrollment of the managed device on the organizational network after reset of the managed device; and
  issue the one-time password to the managed device responsive to a determination that the managed device lacks the hardware authenticator.

8. The management server of claim 1, wherein the public network is the Internet.

9. The management server of claim 1, wherein the reset operation is automatically initiated by the management server upon determining that the managed device contains a malicious threat.

10. The management server of claim 1, wherein sending the one-time password to the managed device further comprises instructing the managed device to install the one-time password in a persistent storage area such that the one-time password persists through the reset operation.

11. The management server of claim 1, wherein the configuration settings comprise multiple security settings that are issued to the managed device by the management server after the reset operation and that were associated with the managed device prior to the reset operation.

12. The management server of claim 1, wherein the configuration settings comprise a certificate that is issued to the managed device by the management server after the reset operation and that was associated with the managed device prior to the reset operation.

13. A method comprising:
  receiving, over a public network, a request to reset a managed device, the managed device having been configured according to a previous configuration setting to access an organizational network associated with a particular organization;
  determining that the managed device does not include a hardware authenticator for re-enrollment of the managed device on the organizational network after reset of the managed device;
  responsive to receiving the request to reset the managed device and determining that the managed device does not include the hardware authenticator, generating a one-time password for use by the managed device in automatic re-enrollment in the organizational network after reset of the managed device;
  issuing the one-time password over the public network to the managed device;
  receiving, over the public network, a post-reset password from the managed device; and
  responsive to validation of the post-reset password against the one-time password, re-enrolling the managed device in the organizational network by issuing the previous configuration setting to the managed device over the public network, the previous configuration setting allowing the managed device to access the organizational network.

14. The method of claim 13, wherein the public network is the Internet.

15. The method of claim 14, further comprising validating the post-reset password by checking the post-reset password against a one-time password stored on a storage server.

16. The method of claim 15, wherein validating the post-reset password further comprises checking the post-reset password against a validity criteria.

17. The method of claim 16, wherein the validity criteria is a time-bound validity criteria, and the post-reset password must be received from the managed device within a time limit specified by the time-bound validity criteria.

18. A system comprising:
  a processor; and
  a memory storing computer-readable instructions, which when executed by the processor, cause the processor to re-enroll the system in an organizational network automatically by:
  receiving, from a management server over a public network, a one-time password for use in re-enrollment of the system into the organizational network associated with a particular organization, the one-time password being associated with a reset request to reset the system;
  installing the one-time password into a persistent storage area;
  initiating a reset process to reset the system to an initial factory settings state;
  issuing the one-time password that was installed in the persistent storage area over the public network to the management server for validation to re-enroll the system in the organizational network;
  receiving, from the management server over the public network, configuration settings that were associated with the system prior to initiating the reset process; and
  configuring the system according to the configuration settings, the configuring allowing the system to access the organizational network.

19. The system of claim 18, wherein the one-time password stored in the persistent storage area persists through the reset process.

20. The system of claim 18, wherein re-enrolling the system in the organizational network automatically comprises:
  indicating, to the management server, that a hardware authenticator is not present in the system.

21. A method performed by a computing device, the method comprising:
  receiving, from a management server over a public network, a one-time password for use in re-enrollment of the computing device into an organizational network associated with a particular organization, the one-time password being associated with a reset request to reset the computing device;
  installing the one-time password into a persistent storage area on the computing device;
  initiating a reset process to reset the computing device to an initial factory settings state;
  issuing the one-time password that was installed in the persistent storage area over the public network to the management server for validation to re-enroll the computing device in the organizational network;

receiving, from the management server over the public network, configuration settings that were associated with the computing device prior to initiating the reset process; and configuring the computing device according to the configuration settings, the configuring allowing the computing device to access the organizational network.

\* \* \* \* \*